US011101920B2

(12) United States Patent
Baker et al.

(10) Patent No.: US 11,101,920 B2
(45) Date of Patent: Aug. 24, 2021

(54) METHOD AND APPARATUS FOR SUPPORTING A PARTIAL SUB-FRAME DATA TRANSMISSION IN LTE SYSTEMS

(71) Applicant: Alcatel Lucent, Boulogne Billancourt (FR)

(72) Inventors: Matthew P. J. Baker, Canterbury (GB); Sigen Ye, Whitehouse Station, NJ (US); Teck Hu, Melbourne, FL (US); Shin Horng Wong, Chippenham (GB); Feng Han, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 207 days.

(21) Appl. No.: 15/534,292

(22) PCT Filed: Nov. 7, 2014

(86) PCT No.: PCT/CN2014/090542
§ 371 (c)(1),
(2) Date: Jun. 8, 2017

(87) PCT Pub. No.: WO2016/070398
PCT Pub. Date: May 12, 2016

(65) Prior Publication Data
US 2017/0310422 A1    Oct. 26, 2017

(51) Int. Cl.
*H04W 4/00* (2018.01)
*H04L 1/00* (2006.01)
(Continued)

(52) U.S. Cl.
CPC .......... *H04L 1/0025* (2013.01); *H04L 1/0027* (2013.01); *H04L 1/0033* (2013.01);
(Continued)

(58) Field of Classification Search
CPC ... H04L 1/0025; H04L 1/0027; H04L 1/0033; H04L 1/18; H04L 5/001; H04L 5/0032; H04L 5/0044; H04L 5/0087; H04L 5/0091
See application file for complete search history.

(56) References Cited

U.S. PATENT DOCUMENTS

2014/0029535 A1    1/2014  Medapalli
2014/0170985 A1    6/2014  Raghavan et al.
(Continued)

FOREIGN PATENT DOCUMENTS

CN    101163076 A    4/2008
CN    102244568 A    11/2011
(Continued)

OTHER PUBLICATIONS

International Search Report for PCT/CN2014/090542 dated Jul. 29, 2015.
(Continued)

*Primary Examiner* — Maharishi V Khirodhar
(74) *Attorney, Agent, or Firm* — Fay Sharpe LLP (57) ABSTRACT

A transmitting device performs a channel assessment in a previous sub-frame in an unlicensed carrier. After a successful channel assessment, the transmitting device starts a data transmission. The transmitting device transmits a control message for indicating the data transmission in (E)PDCCH. The control message may include the starting time of the data transmission and/or at least one transmission characteristic in the previous sub-frame. The transmission device may transmit an initial control message for indicating a potential data transmission being started in the sub-frame in which the initial control message is transmitting. Method and apparatus enable (E)CCA to take place at any time, and data transmission to start earlier than the next sub-frame boundary after a successful completion of (E)CCA, thus improving the data transmission capacity, especially in circumstances when the maximum length of transmission is constrained.

12 Claims, 6 Drawing Sheets

(51) Int. Cl.
  *H04L 1/18*  (2006.01)
  *H04W 72/04*  (2009.01)
  *H04L 5/00*  (2006.01)

(52) U.S. Cl.
  CPC ............... *H04L 1/18* (2013.01); *H04L 5/001* (2013.01); *H04L 5/0032* (2013.01); *H04L 5/0044* (2013.01); *H04L 5/0087* (2013.01); *H04L 5/0091* (2013.01); *H04W 72/042* (2013.01); *H04W 72/0446* (2013.01)

(56) References Cited

U.S. PATENT DOCUMENTS

| | | | | |
|---|---|---|---|---|
| 2015/0023315 A1* | 1/2015 | Yerramalli | .......... | H04W 74/002 370/330 |
| 2016/0073391 A1* | 3/2016 | Awad | ............ | H04L 1/1822 370/329 |
| 2017/0238311 A1* | 8/2017 | Hooli | .............. | H04W 74/0816 370/329 |

FOREIGN PATENT DOCUMENTS

| | | |
|---|---|---|
| CN | 102273307 A | 12/2011 |
| CN | 102611525 A | 7/2012 |
| WO | 2016/053173 A1 | 4/2016 |
| WO | 2016/072717 A1 | 5/2016 |

OTHER PUBLICATIONS

Alcatel-Lucent Shanghai Bell et al., "Considerations on LBT Enhancements for Licensed-Assisted Access", 3GPP TSG RAN WG1 Meeting #78bis, R1-144083, Ljubljana, Slovenia, Aug. 6-10, 2014, Agenda Item: 7.3.2.3, Document for: Discussion/Decision, pp. 1-6.
Alcatel-Lucent Shanghai Bell et al., "LBT Enhancements for Licensed-Assisted Access", 3GPP TSG RAN WG1 Meeting #79, R1-144701, San Francisco, USA, Nov. 17-21, 2014, Agenda Item: 6.3.2.2, Document for: Discussion/Decision, pp. 1-5.

* cited by examiner

METHOD AND APPARATUS FOR SUPPORTING A PARTIAL SUB-FRAME DATA TRANSMISSION IN LTE SYSTEMS

This application is a National Stage Entry of International Application No. PCT/CN2014/090542, filed Nov. 7, 2014, and entitled "METHOD AND APPARATUS FOR SUPPORTING PARTIAL SUB-FRAME DATA TRANSMISSION IN LTE SYSTEMS", the contents of which are incorporated by reference herein.

FIELD OF THE INVENTION

The present invention generally relates to wireless communication technology, and more particularly relates to supporting a partial sub-frame data transmission in Long Term Evolution (LTE) systems.

BACKGROUND OF THE INVENTION

In LTE Licensed-Assisted Access (LAA), an LTE carrier operating in an unlicensed spectrum is aggregated with an LTE carrier in a licensed spectrum. The sub-frame boundaries on the unlicensed carrier would typically be aligned with those on the licensed carrier.

Before a data transmission can take place on the unlicensed carrier, regulations in some parts of the world require that a Clear Channel Assessment (CCA) or Extended CCA (ECCA) procedure is carried out to sense the channel to determine that it is free of transmissions from other devices.

If the (E)CCA carried out by a device determines that the channel is free, the device may commence transmission immediately. If the device does not commence transmission immediately, there is a risk that another device will sense the channel and determine that it is free and start its own transmissions which will prevent the first device from starting to transmit (or will interfere with the transmissions of the first device if the first device subsequently starts to transmit without performing another (E)CCA.

However, in LTE, transmissions can only start at certain time instants, namely at a sub-frame boundary (in the case of control or data transmission) or at a small (up to 4 OFDM symbols max) offset from a sub-frame boundary (in the case of data transmission if it is preceded by control signaling). If the timing of the (E)CCA is located so as to immediately precede the possible time of starting transmission, the number of occasions at which a device can sense the channel will be limited, and devices using a different technology which does not have such a constraint will have more opportunities to transmit, thus putting LTE devices at a disadvantage on the unlicensed carrier. On the other hand, if there are no constraints on the timing of the (E)CCA, it is necessary to define a mechanism to start LTE transmission at a more flexible set of positions.

In one existing proposal, (E)CCA may be started in the first OFDM symbol of a sub-frame. Data transmission would be started in the fourth OFDM symbol if (E)CCA succeeds. If (E)CCA succeeds prior to the fourth symbol, a kind of preamble is transmitted (not carrying any data) in order to grab the channel until the start of data transmission. This proposal has the disadvantage that the (E)CCA must start at a sub-frame boundary and is limited to 3 symbols (about 210 us). If the channel is not available, the transmitting device has to wait until the boundary of the next sub-frame. These restrictions on starting time and duration of (E)CCA mean that other systems have more opportunities to grab the channel.

In another existing proposal, (E)CCA may be started and terminated at any time, and the device transmits a preamble after (E)CCA succeeds until the next sub-frame boundary, and then transmits data. The preamble transmission is designed to prevent another user from grabbing the channel before the start of data transmission, and may also assist the receiver with Automatic Gain Control (AGC) and/or synchronization. However, since regulations in some parts of the world further impose a restriction on the maximum length of transmission time by a given device (e.g. 4 ms), the transmission of a preamble may lower spectral efficiency and cause more interference to other systems.

Therefore, it is desired to design a procedure that enables the channel to be grabbed more often than once per LTE sub-frame, but also with high spectral efficiency (minimizing resource wastage with preambles). In order to achieve this, it is necessary to address the fact that normally in LTE, Downlink Control Information (DCI) is transmitted in the same sub-frame as any data transmission, indicating information such as the details of the transmission resources (e.g. in time and frequency) used for the data transmission, and the modulation and coding scheme (MCS) used for the data transmission. However, since DCI cannot be determined at the start of a sub-frame whether or not (E)CCA will succeed during that sub-frame, this control information will not be available to provide the receiver with the necessary information to enable data reception before the next sub-frame.

OBJECT AND SUMMARY OF THE INVENTION

In order to overcome the drawback in the existing solutions, a proper control message needs to be designed to enable a transmitter to grab channel more often than once per LTE sub-frame, and meanwhile to provide a high spectral efficiency.

It is an object of the present invention to provide method and apparatus for supporting a partial sub-frame data transmission in LTE systems.

According to a first aspect of the present invention, there provides a method for supporting a partial sub-frame data transmission in a transmitting device, comprising: A. performing a channel assessment in a previous sub-frame of a carrier; B. starting a data transmission in the previous sub-frame after the successful channel assessment in the carrier; and C. transmitting to a receiving device, in a current sub-frame, a control message for indicating the data transmission started in the previous sub-frame after the successful channel assessment.

In one embodiment of the present invention, the control message comprises a starting time indicator for indicating a starting time of the data transmission started in the previous sub-frame.

In one embodiment of the present invention, an association between the time indicator and the starting time of the data transmission is configured by a high-layer signaling or predetermined.

In one embodiment of the present invention, the method in the first aspect further comprises before the step B: B1. transmitting to the receiving device an initial control message for indicating a potential data transmission being started in the sub-frame in which the initial control message is transmitted.

In one embodiment of the present invention, the initial control message further includes duration information for indicating a validity period of the information contained in the initial control message.

In one embodiment of the present application, the validity period of the information contained in the initial control message is pre-defined or configured by a higher layer signaling.

In one embodiment of the present invention, the initial control message further comprises an indication of at least one initial transmission characteristic of the data transmission.

In one embodiment of the present invention, the indication of at least one initial transmission characteristic indicates frequency resource used by the data transmission.

In one embodiment of the present invention, the control message further comprises an indication of at least one transmission characteristic of the data transmission.

In one embodiment of the present invention, the at least one transmission characteristic comprises one or more of resource allocation information, modulation and coding scheme information and transport block size information.

In one embodiment of the present invention, the indication of the at least one transmission characteristic is indicated by an index in the control message, an association between the index and the at least one transmission characteristic is configured by a high layer signaling or predetermined.

In one embodiment of the present invention, the at least one transmission characteristic is the same for the data transmission in the previous sub-frame and a data transmission in the current sub-frame.

According to a second aspect of the present invention, there provides a method for supporting a partial sub-frame data transmission in a receiving device, comprising: receiving from a transmitting device, a data transmission in a previous sub-frame after a successful channel assessment in a carrier; buffering the previous sub-frame after the successful channel assessment in the carrier; receiving from the transmitting device, in a current sub-frame, the control message for indicating the data transmission started in the previous sub-frame; and decoding the data transmission from the transmitting device based on the control message.

According to a third aspect of the present invention, there provides a method for supporting a partial sub-frame data transmission in a receiving device, comprising: receiving from a transmitting device, an initial control message for indicating a data transmission being started in a sub-frame in which the initial control message is transmitting; receiving from the transmitting device, a data transmission after a successful channel assessment in a carrier; buffering the sub-frame in which the initial control message is transmitting; stopping the buffering when an indication of at least one transmission characteristic in a control message is received; and decoding the data transmission based on the initial control message and the at least one transmission characteristic.

According to a fourth aspect of the present invention, there provides an apparatus for supporting a partial sub-frame data transmission in a transmitting device, comprising: a channel assessment unit, configured to perform a channel assessment in a previous sub-frame in a carrier; a data transmission unit, configured to start the data transmission in the previous sub-frame after the successful channel assessment in the carrier to the receiving device; and a control message transmission unit, configured to transmit to the receiving device, in a current sub-frame, a control message for indicating the data transmission started in the previous sub-frame after the successful channel assessment.

According to a fifth aspect of the present invention, there provides an apparatus for supporting a partial sub-frame data transmission in a transmitting device, comprising: a channel assessment unit, configured to perform a channel assessment in a previous sub-frame in a carrier; an initial control message transmission unit, configured to transmit to the receiving device, an initial control message for indicating a potential data transmission being started in the sub-frame in which the initial control message is transmitted; a data transmission unit, configured to start a data transmission after a successful channel assessment in the carrier to a receiving device; and a control message transmission unit, configured to transmit to the receiving device, a control message for indicating the data transmission after the successful channel assessment, wherein the control message includes an indication of at least one transmission characteristic of the data transmission.

According to a sixth aspect of the present invention, there provides an apparatus for supporting a partial sub-frame data transmission in a receiving device, comprising: a data receiving unit, configured to receive from a transmitting device, a data transmission in a previous sub-frame after a successful channel assessment in a carrier; a buffering unit, configured to buffer the previous sub-frame after the successful channel assessment in the carrier; a control message receiving unit, configured to receive from the transmitting device, in a current sub-frame, the control message for indicating the data transmission started in the previous sub-frame; and a decoding unit, configured to decode the data transmission from the transmitting device based on the control message received in the current sub-frame.

According to seventh aspect of the present invention, there provides an apparatus for supporting a partial sub-frame data transmission in a receiving device, comprising: an initial control message receiving unit, configured to receive from a transmitting device, an initial control message for indicating a potential data transmission being started in a sub-frame in which the initial control message is transmitting; a data receiving unit, configured to receive from the transmitting device, a data transmission after a successful channel assessment in a carrier; a buffering unit, configured to buffer the sub-frame in which the initial control message is transmitting; a buffering control unit, configured to stop the buffering when an indication of at least one transmission characteristic in a control message is received, wherein the control message indicates the data transmission started in a previous sub-frame; and a decoding unit, configured to decode the data transmission based on the initial control message and the at least one transmission characteristic in the control message.

The key advantage of the present invention compared to the prior art described above is that it enables (E)CCA to take place at any time, and data transmission to start earlier than the next sub-frame boundary after a successful completion of (E)CCA, thus improving the data transmission capacity, especially in circumstances when the maximum length of transmissions is constrained. The present invention also enables the transmission in LTE-Unlicensed to satisfy the regulations for unlicensed operation with high spectral efficiency.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied. It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Figure 1:
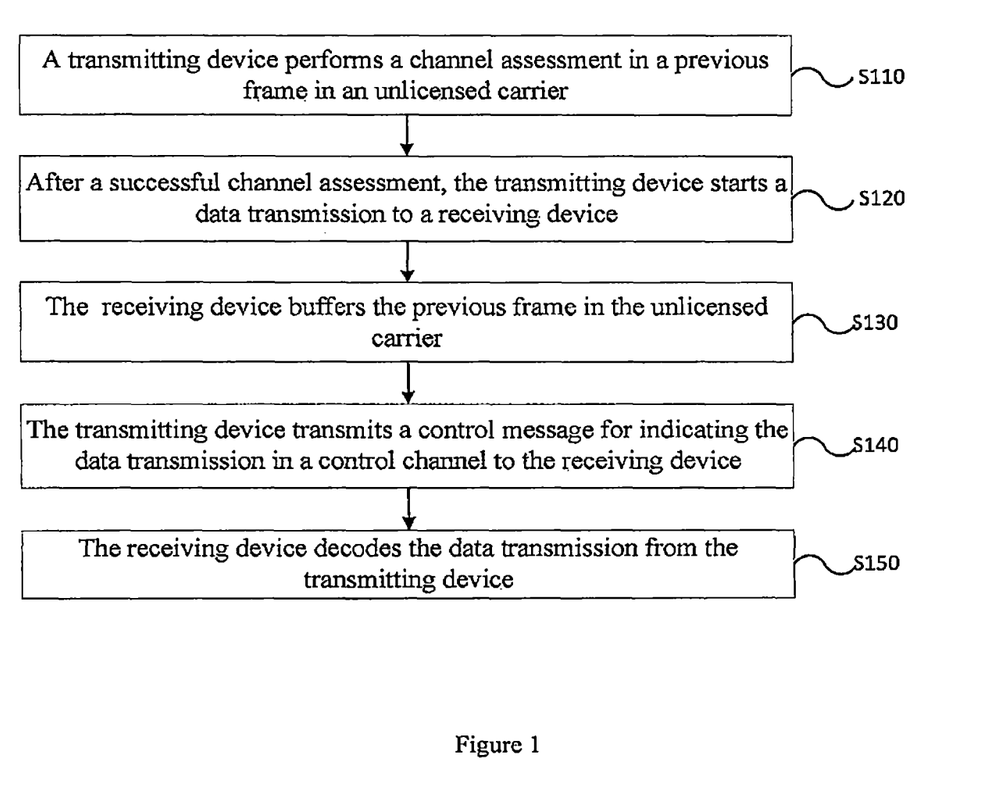
FIG. 1 illustrates a flow chart for supporting a partial sub-frame transmission in LTE-LAA system according to one exemplary embodiment of the present invention.

FIG. 1 illustrates a flow chart for supporting a partial sub-frame transmission in LTE-LAA system according to one exemplary embodiment of the present invention.

According to the present invention, a transmitting device performs (E)CCA on e.g. an unlicensed carrier and starts transmission substantially as soon as (E)CCA is successful (i.e. indicating the carrier to be free), and the transmission includes starting data transmission before the next sub-frame boundary after successful completion of (E)CCA.

In S110, a transmitting device performs a channel assessment, e.g. (E)CCA in a previous sub-frame in an unlicensed carrier.

In step S120, after a successful channel assessment, e.g. (E)CCA, the transmitting device starts a data transmission on e.g. PDSCH (Physical Downlink Shared CHannel) to a receiving device.

In step S130, the receiving device buffers the whole of the previous sub-frame in the unlicensed carrier.

In step S140, the transmitting device transmits a control message for indicating the data transmission in a control channel, e.g. (E)PDCCH ((Enhanced) Physical Downlink Control CHannel) to the receiving device. The control message may include the starting time of the data transmission and at least one transmission characteristic (e.g. MCS, resource allocation) in the previous sub-frame.

In step S150, the receiving device may discard the buffered data samples which contain no data and decodes the data transmission from the transmitting device.

Figure 2:
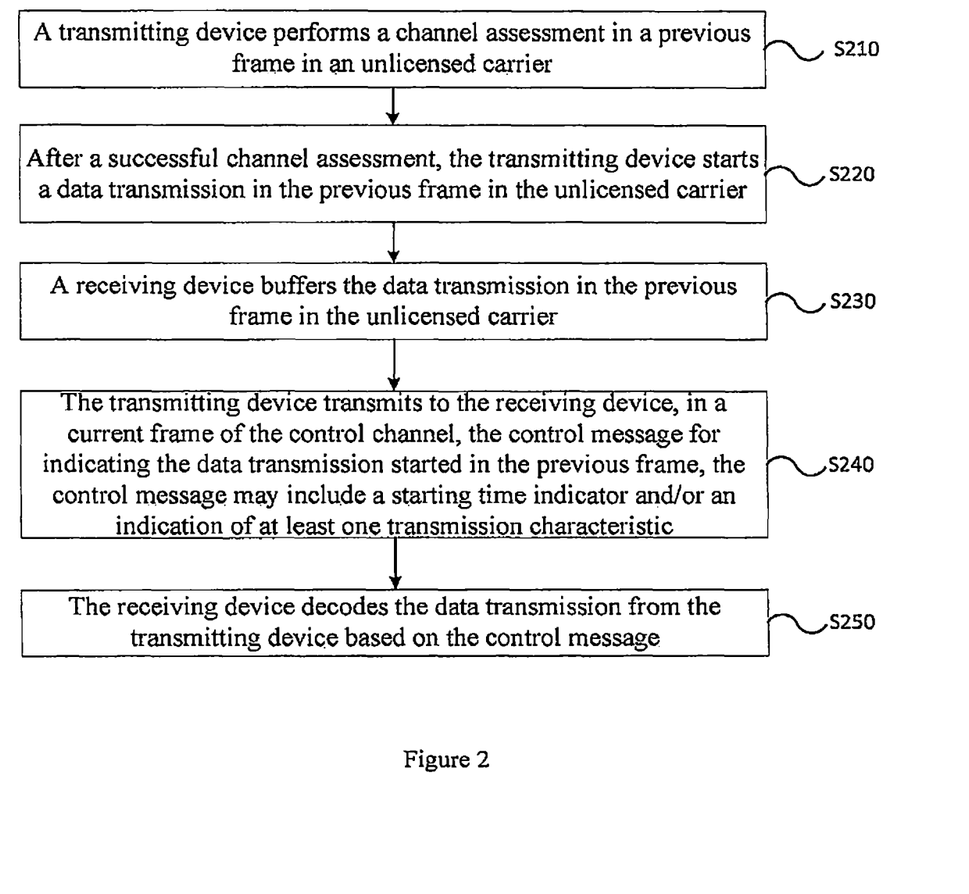
FIG. 2 illustrates a flow chart for supporting a partial sub-frame transmission in LTE-LAA system according to another exemplary embodiment of the present invention.

FIG. 2 illustrates a flow chart for supporting a partial sub-frame transmission in LTE-LAA system according to another exemplary embodiment of the present invention.

In step S210, a transmitting device performs a channel assessment, e.g. (E)CCA, in a previous sub-frame in an unlicensed carrier.

In step S220, after a successful channel assessment (the sensed unlicensed carrier is free) in e.g. PDSCH in the unlicensed carrier, the transmitting device starts a data transmission in the previous sub-frame after the successful channel assessment in the unlicensed carrier to a receiving device.

In step S230, the receiving device may buffer the whole of the previous sub-frame after the successful channel assessment in the unlicensed carrier.

In step S240, the transmitting device transmits to the receiving device, in a current sub-frame of a control channel e.g. (E)PDCCH, a control message for indicating the data transmission started in the previous sub-frame after the successful channel assessment. The current sub-frame of the control channel in this invention refers to the next sub-frame after the one in which the data transmission starts.

The control message may comprise an indication of the starting time of the data transmission during the previous sub-frame (for example in terms of an index of an OFDM or SC-FDMA symbol). A set of possible starting points may be configured in advance by higher-layer signaling or are predetermined by specification, and the control message indicates which of the plurality of possible values was actually used for the data transmission in the previous sub-frame. Such possible starting points may take into account the proximity of reference signals designed for demodulation of the data; for example, it might not be permitted to start data transmission after the last demodulation reference signals in the sub-frame have been transmitted. The starting time of the data transmission during the previous sub-frame may be predetermined if it is indicated that such data transmission took place; for example, it might be predefined that any such data transmission would start at the mid-point of the sub-frame (a.k.a. the slot boundary).

The control message may further comprise an indication of one or more transmission characteristics, e.g. a DCI message of the data transmission which started in the previous sub-frame (for example frequency-domain resources, MCS, transport block size). This recognizes that some characteristics of the data transmission are not predictable and may depend on the starting time of the data transmission after the transmitting device has successfully completed the (E)CCA process. In such cases, the one or more indicated transmission characteristics are those of the continuing data transmission in the sub-frame containing the control message, and it is defined that the one or more transmission characteristics of the data transmitted in the previous sub-frame are the same as those of the data transmitted in the sub-frame containing the control message.

A plurality of possible values of one or more transmission characteristics of the data transmission in the previous sub-frame may be configured in advance by a higher-layer signaling or are predetermined by specification, and the control message indicates which of the plurality of possible values was actually used for the data transmission in the previous sub-frame. That is, the one or more transmission characteristics may be indicated by an index in the control channel, an association between the index and the one or more transmission characteristics may be configured by a high layer signaling or predetermined, e.g. a mapping between the one or more characteristics and the index.

In step S250, the receiving device decodes the data transmission from the transmitting device based on control message which may include the starting time and the at least one transmission characteristics. After receiving the control message in the subsequent sub-frame, the receiving device may discard buffered samples which contain no data.

Figure 3:
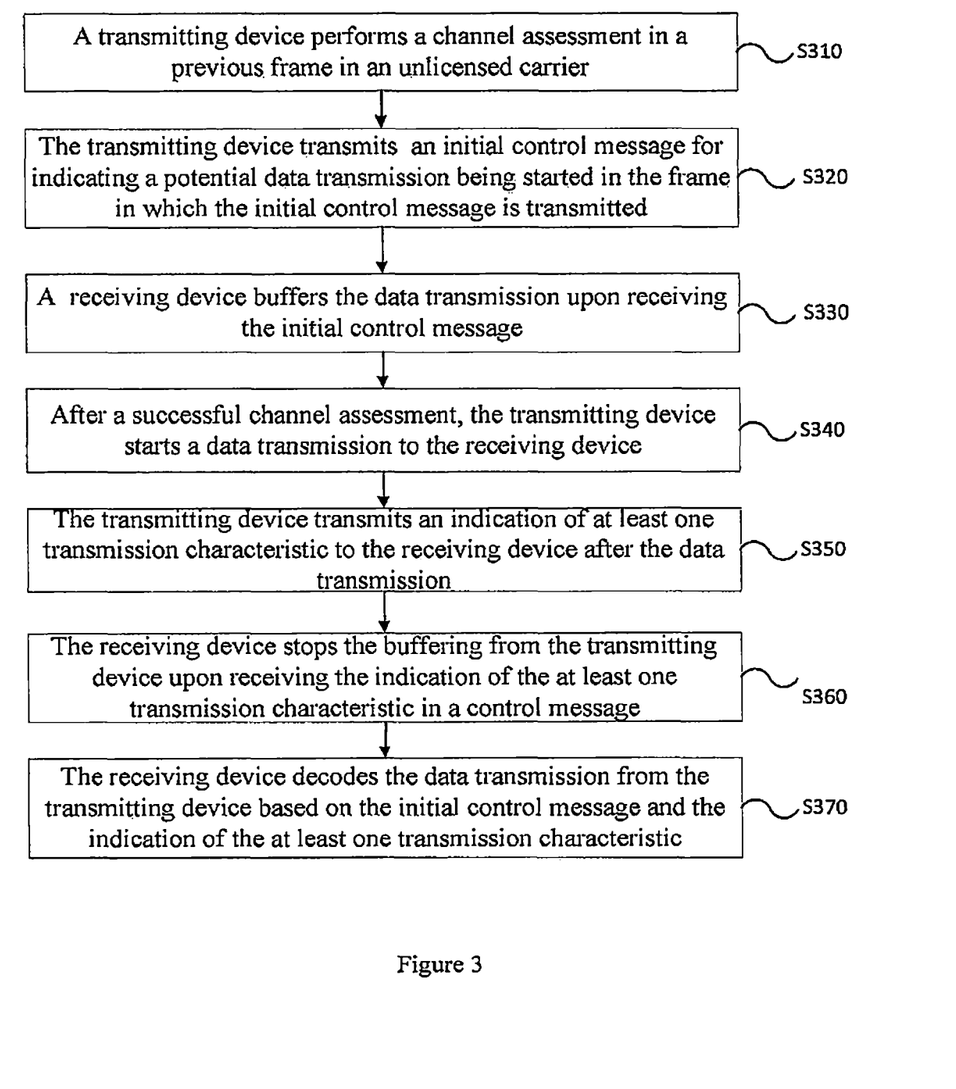
FIG. 3 illustrates a flow chart for supporting a partial sub-frame transmission in LTE-LAA system according to yet another exemplary embodiment of the present invention.

FIG. 3 illustrates a flow chart for supporting partial sub-frame transmission in LTE-LAA system according to yet another exemplary embodiment of the present invention.

In step S310, a transmitting device performs a channel assessment in a previous frame in an unlicensed carrier.

In step S320, the transmitting device transmits in a control channel e.g. (E)PDCCH, an initial control message for indicating a potential data transmission might start in the sub-frame in which the initial control message is transmitted. The indication may be valid for more than one sub-frame. The duration for which the indication is valid can be either pre-defined or signaled using a higher layer signaling or carried within the control message. The initial control message may further include one or more initial transmission characteristics of data transmission which might start in the sub-frame in which the further control message is transmitted. For example, the control message may indicate the PRBs in the frequency domain which would be used by a data transmission if a data transmission starts during the sub-frame in which the control message is transmitted; this would enable a receiving device to reduce the number of samples it needs to buffer before it receives at least one transmission characteristic, e.g. a DCI message in the next sub-frame.

In step S330, the receiving device may buffer the data transmission upon receiving the initial control message. The receiver would use the initial control message to selectively buffer the potentially useful samples for these sub-frames.

In step S340, after a successful channel assessment, the transmitting device starts a data transmission to the receiving device.

In step S350, the transmitting device transmits an indication of at least one transmission characteristic, e.g. DCI message to the receiving device after the data transmission. The indication of the at least one transmission characteristics is similar to those described in S240.

In step S360, the receiving device may stop buffering the data transmission from the transmitting device upon receiving at least one transmission characteristic, e.g. DCI that indicates an actual data transmission. This is beneficial in case (E)CCA takes a long time (possibly longer than a sub-frame) on a congested channel.

In step S370, the receiving device decodes the data transmission from the transmitting device based on the initial control message and the at least one transmission characteristic.

Figure 4:
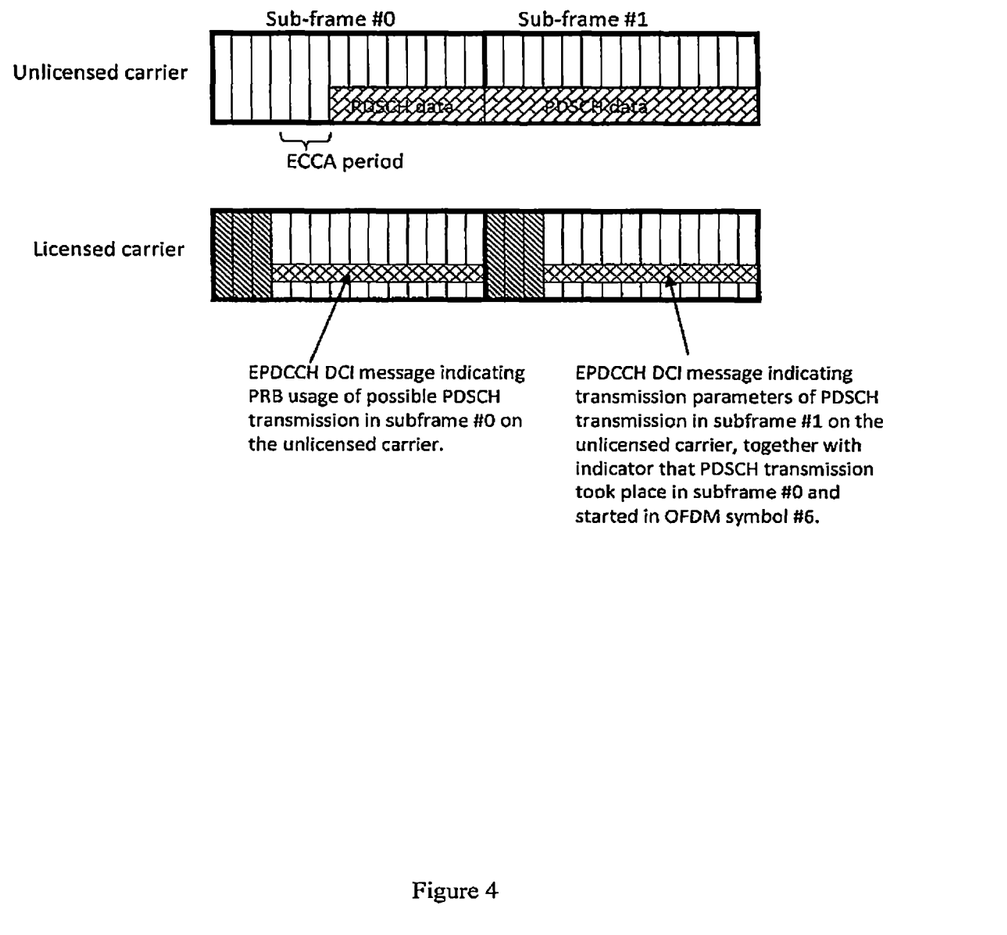
FIG. 4 illustrates a schematic view of data transmission and control message transmission in LTE-LAA system.

FIG. 4 illustrates a schematic view of data transmission and control message transmission in LTE-LAA system.

As illustrated in FIG. 4, an LTE eNB transmits a DCI message on (E)PDCCH in sub-frame #0 indicating that a PDSCH data transmission may take place during this sub-frame, using PRBs #0-10. The eNB then successfully completes (E)CCA during OFDM symbol #5 of sub-frame #0. The eNB starts PDSCH data transmission in OFDM symbol #6 using PRBs #0-10. A receiving UE buffers all the PRBs before successfully decoding the DCI message and buffers at least PRBs #0-10 after decoding the DCI. In sub-frame #1, the eNB transmits another DCI message on PDCCH, and a second PDSCH data transmission. The DCI message provides all the transmission parameters for the second PDSCH data transmission, as well as an indication that PDSCH data transmission took place in sub-frame #0 beginning in OFDM symbol #6. The receiving UE then assumes that all other transmission parameters of the data transmission in sub-frame #0 are the same as those in sub-frame #1, with the possible exception of the redundancy version which may be assumed to have been incremented following a known pattern.

The encoded data transmitted in sub-frame #0 may be derived from the same transport block as the encoded data transmitted in sub-frame #1. The encoded data transmitted in the two sub-frames may also be derived from different transport blocks.

The DCI messages are typically transmitted on a first LTE carrier (e.g. a licensed carrier), while the PDSCH data transmissions occur on a second carrier (e.g. an unlicensed carrier); the DCI messages in this case typically include a Carrier Indicator Field (CIF) indicating an identifier of the second carrier. In some cases, at least the DCI message in sub-frame #1 may be transmitted on the second (e.g. unlicensed) carrier.

In any of the above embodiments, the transmitting device may transmit a preamble signal between a successful completion of (E)CCA and the start of the data transmission. This preamble signal may be used by a receiving device to identify the starting point of the data transmission, and/or for other purposes such as synchronization or Automatic Gain Control (AGC).

In any of the above embodiments, the transmitting device includes but not limited to a base station or eNB, the terminology sub-frame includes but not limited to the sub-frame in LTE system.

Figure 5:
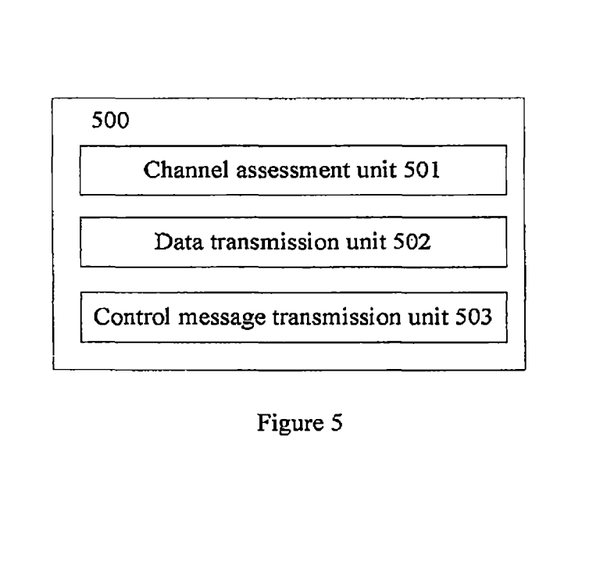
FIG. 5 illustrates an apparatus schematic view for supporting a partial sub-frame transmission in a transmitting device according to one exemplary embodiment of the present application.

FIG. 5 illustrates an apparatus schematic view for supporting a partial sub-frame transmission in a transmitting device according to one exemplary embodiment of the present application in connection to FIG. 2 and FIG. 4. The apparatus 500 in FIG. 5 may be in a mobile terminal, a base station or eNB. The apparatus 500 includes a channel assessment unit 501, a data transmission unit 502 and a control message transmission unit 503.

The channel assessment unit 501 is configured to perform a channel assessment in a previous sub-frame in a carrier. The data transmission unit 502 is configured to start the data transmission in the previous sub-frame after the successful channel assessment in the carrier to the receiving device.

The control message transmission unit 503 is configured to transmit to the receiving device, in a current sub-frame of the control channel, a control message for indicating the data transmission started in the previous sub-frame after the successful channel assessment.

Figure 6:
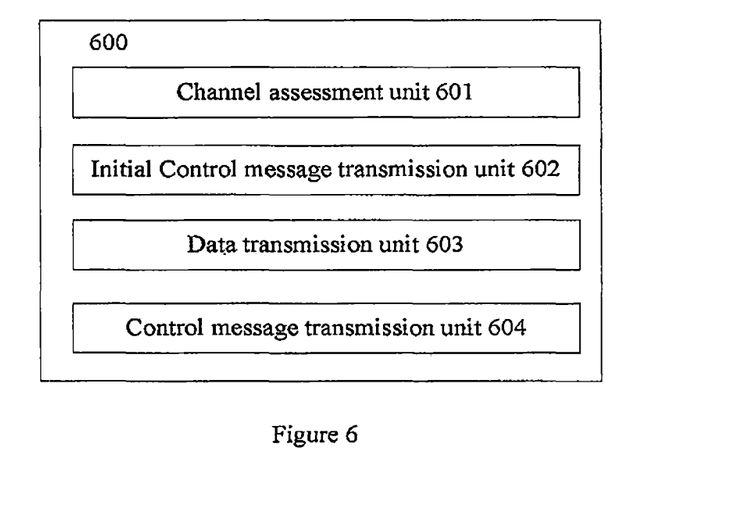
FIG. 6 illustrates an apparatus schematic view for supporting a partial sub-frame transmission in a transmitting device according to another exemplary embodiment of the present application.

FIG. 6 illustrates an apparatus schematic view for supporting a partial sub-frame transmission in a transmitting device according to another exemplary embodiment of the present application in connection to FIG. 3 and FIG. 4. The apparatus 600 in FIG. 6 may be in a mobile terminal, a base station or an eNB. The apparatus 600 includes a channel assessment unit 601, an initial control message transmission unit 602, a data transmission unit 603 and a control message transmission unit 604.

The channel assessment unit 601, configured to perform a channel assessment in a previous sub-frame in a carrier. The initial control message transmission unit 602 is configured to transmit to the receiving device, in a control channel, an initial control message for indicating a potential data transmission being started in the sub-frame in which the initial control message is transmitted. The data transmission unit 603 is configured to start a data transmission after a successful channel assessment in the carrier to a receiving device. The control message transmission unit 604 is configured to transmit to the receiving device, in the control channel, a control message for indicating the data transmission after the successful channel assessment, wherein the control message includes an indication of at least one transmission characteristic of the data transmission.

Figure 7:
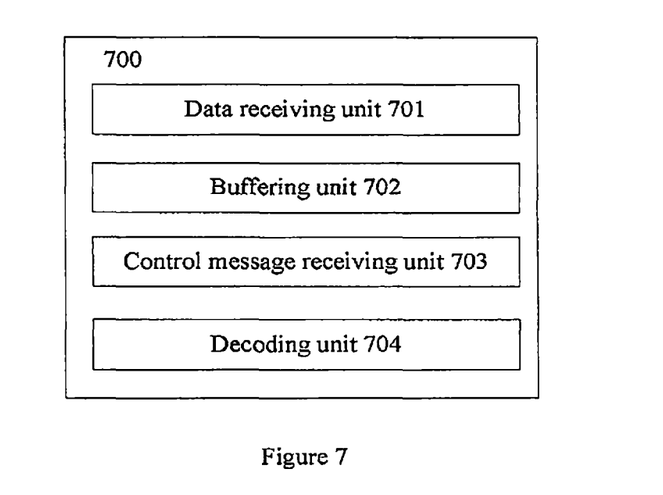
FIG. 7 illustrates an apparatus schematic view for supporting a partial sub-frame transmission in a receiving device according to one exemplary embodiment of the present application.

FIG. 7 illustrates an apparatus schematic view for supporting a partial sub-frame transmission in a receiving device according to one exemplary embodiment of the present application in connection to FIG. 2 and FIG. 4. The apparatus 700 comprises a data receiving unit 701, a buffering unit 702, a control message receiving unit 703 and a decoding unit 704.

The data receiving unit 701 is configured to receive from a transmitting device, a data transmission in a previous sub-frame after a successful channel assessment in a carrier. The buffering unit 702 is configured to buffer the previous sub-frame after the successful channel assessment in the carrier. The control message receiving unit 703 is configured to receive from the transmitting device, in a current sub-frame of a control channel, the control message for indicating the data transmission started in the previous sub-frame. The decoding unit 704 is configured to decode the data transmission from the transmitting device based on the control message received in the current sub-frame.

Figure 8:
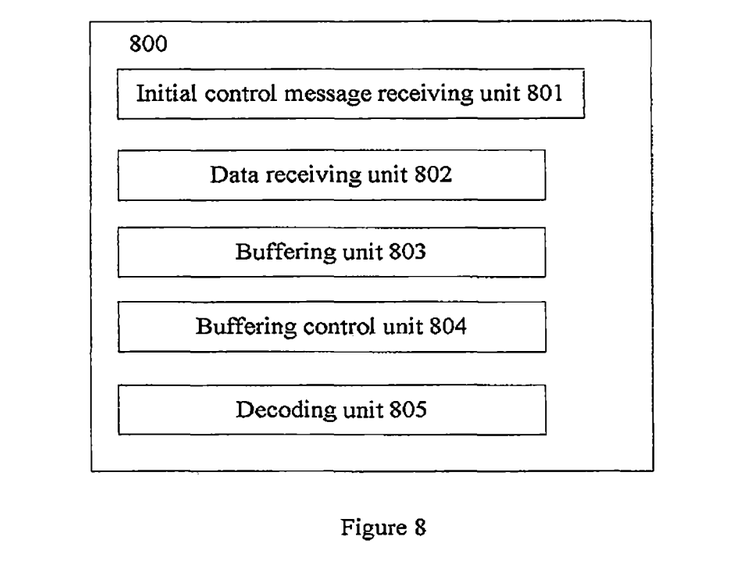
FIG. 8 illustrates an apparatus schematic view for supporting a partial sub-frame transmission in a receiving device according to another exemplary embodiment of the present application.

FIG. 8 illustrates an apparatus schematic view for supporting a partial sub-frame transmission in a receiving device according to one exemplary embodiment of the present application in connection to FIG. 3 and FIG. 4. The apparatus 800 comprises an initial control message receiving unit 801, a data receiving unit 802, a buffering unit 803, a buffering control unit 803 and a decoding unit 805.

The initial control message receiving unit 801, configured to receive from a transmitting device, in a control channel, an initial control message for indicating a potential data transmission being started in a sub-frame in which the initial control message is transmitting. The data receiving unit 802 is configured to receive from the transmitting device, a data transmission after a successful channel assessment in a carrier. The buffering unit 803 is configured to buffer the sub-frame in which the initial control message is transmitting. The buffering control unit 804 is configured to stop the buffering when an indication of at least one transmission characteristic in a control message is received, and the control message indicates the data transmission started in a previous sub-frame. The decoding unit 805 is configured to decode the data transmission based on the initial control message and the at least one transmission characteristic in the control message.

While at least one exemplary embodiment has been presented in the foregoing summary and detailed description, it should be noted that the above described embodiments are given for describing rather than limiting the invention, and it is to be understood that modifications and variations may be resorted to without departing from the spirit and scope of the invention as those skilled in the art readily understand. It should also be understood that various changes may be made in the function and arrangement of the elements/steps described in an exemplary embodiment. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for supporting a partial sub-frame data transmission in a first device, comprising:
performing a channel assessment in a previous sub-frame of a carrier;
starting a data transmission in the previous sub-frame after the successful channel assessment in the carrier;
transmitting to a second device, in a current sub-frame, a control message for indicating the data transmission started in the previous sub-frame after the successful channel assessment; and
before the starting, transmitting to the second device an initial control message for indicating a potential data transmission being started in a sub-frame in which the initial control message is transmitted;
wherein the initial control message further includes duration information for indicating a validity period of information contained in the initial control message.

2. The method according to claim 1, wherein the control message comprises a starting time indicator for indicating a starting time of the data transmission started in the previous sub-frame.

3. The method according to claim 2, wherein an association between the time indicator and the starting time of the data transmission is configured by a high-layer signaling or predetermined.

4. The method according to claim 1, wherein the validity period of information contained in the initial control message is pre-defined or configured by a higher layer signaling.

5. The method according to claim 1, the initial control message further comprises an indication of at least one initial transmission characteristic of the data transmission.

6. The method according to claim 5, wherein the indication of at least one initial transmission characteristic indicates frequency resource used by the data transmission.

7. The method according to claim 1, wherein the control message further comprises an indication of at least one transmission characteristic of the data transmission.

8. The method according to claim 7, wherein the at least one transmission characteristic comprises one or more of resource allocation information, modulation and coding scheme information and transport block size information.

9. The method according to claim 7, wherein the indication of the at least one transmission characteristic is indicated by an index in the control message, an association between the index and the at least one transmission characteristic is configured by a high layer signaling or predetermined.

10. The method according to claim 7, wherein the at least one transmission characteristic is the same for the data transmission in the previous sub-frame and a data transmission in the current sub-frame.

11. An apparatus for supporting a partial sub-frame data transmission in a first device, comprising one or more processors configured to:
perform a channel assessment in a previous sub-frame in a carrier;
start the data transmission in the previous sub-frame after the successful channel assessment in the carrier to the second device;
transmit to the second device, in a current sub-frame, a control message for indicating the data transmission started in the previous sub-frame after the successful channel assessment;
before starting the data transmission, transmit to the second device an initial control message for indicating a potential data transmission being started in a sub-frame in which the initial control message is transmitted;
wherein the initial control message further includes duration information for indicating a validity period of information contained in the initial control message.

12. An apparatus for supporting a partial sub-frame data transmission in a first device, comprising one or more processors configured to:
perform a channel assessment in a previous sub-frame in a carrier;
transmit to the second device, an initial control message for indicating a potential data transmission being started in the sub-frame in which the initial control message is transmitted;
start a data transmission after a successful channel assessment in the carrier to a second device and after transmission of the initial control message; and
transmit to the second device, a control message for indicating the data transmission after the successful channel assessment, wherein the control message includes an indication of at least one transmission characteristic of the data transmission;
wherein the initial control message further includes duration information for indicating a validity period of information contained in the initial control message.

* * * * *